United States Patent
Sharma et al.

(10) Patent No.: US 11,513,492 B2
(45) Date of Patent: Nov. 29, 2022

(54) DETERMINING A NOISE BASED START OF MOTION OF AN IMPLEMENT OF A WORK MACHINE

(71) Applicant: Caterpillar Inc., Peoria, IL (US)

(72) Inventors: Amit Sharma, Dunlap, IL (US); Steven C. Budde, Dunlap, IL (US); Jeremy J. Diaz, Dunlap, IL (US); Raghavendra Boloor, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 330 days.

(21) Appl. No.: 16/748,503

(22) Filed: Jan. 21, 2020

(65) Prior Publication Data

US 2021/0223754 A1 Jul. 22, 2021

(51) Int. Cl.
  *G05B 19/401* (2006.01)
  *G01P 3/00* (2006.01)
  *G01P 13/00* (2006.01)
  *E02F 9/26* (2006.01)

(52) U.S. Cl.
  CPC ............ *G05B 19/401* (2013.01); *E02F 9/265* (2013.01); *G01P 3/00* (2013.01); *G01P 13/00* (2013.01); *G05B 2219/31304* (2013.01)

(58) Field of Classification Search
  CPC ........ G05B 19/401; G05B 2219/31304; G01P 3/00; G01P 13/00; E02F 3/844; E02F 9/264; G01B 21/042; G01C 21/165
  See application file for complete search history.

(56) References Cited

U.S. PATENT DOCUMENTS

| | | | |
|---|---|---|---|
| 5,918,195 A | 6/1999 | Halgrimson et al. | |
| 8,596,373 B2 | 12/2013 | Montgomery et al. | |
| 8,862,419 B2 | 10/2014 | Bageshwar et al. | |
| 9,567,731 B2 | 2/2017 | Darukhanavala et al. | |
| 2013/0102323 A1* | 4/2013 | Czompo | G01S 19/34 702/141 |
| 2014/0165692 A1 | 6/2014 | Rannow | |
| 2016/0281331 A1 | 9/2016 | Ikegami | |
| 2016/0361958 A1* | 12/2016 | Steiner | B60C 23/0488 |
| 2017/0036899 A1* | 2/2017 | Singh | E02F 3/433 |
| 2017/0174219 A1* | 6/2017 | Omran | B60K 31/042 |
| 2019/0061550 A1* | 2/2019 | Han | B60W 20/13 |

FOREIGN PATENT DOCUMENTS

EP 3569980 11/2019

OTHER PUBLICATIONS

"Pneumatic and Cushion Tire Forklift Trucks, 2022, Doosan Industrial Vehicle America Corp, pp. 1-4". (Year: 2022).*

* cited by examiner

*Primary Examiner* — Santosh R Poudel
(74) *Attorney, Agent, or Firm* — Harrity & Harrity, LLP

(57) ABSTRACT

A control may obtain first data related to a plurality of positions of an implement of a work machine during a first time period and may determine, based on the first data, a first noise value related to at least one velocity of the implement for the first time period. The control device may obtain second data related to a plurality of positions of the implement during a second time period and may determine, based on the second data, a second noise value related to at least one velocity of the implement for the second time period. The control device may determine, based on the first noise value and the second noise value, a start of motion of the implement. The control device may cause, based on determining the start of motion of the implement, the implement to be calibrated.

20 Claims, 3 Drawing Sheets

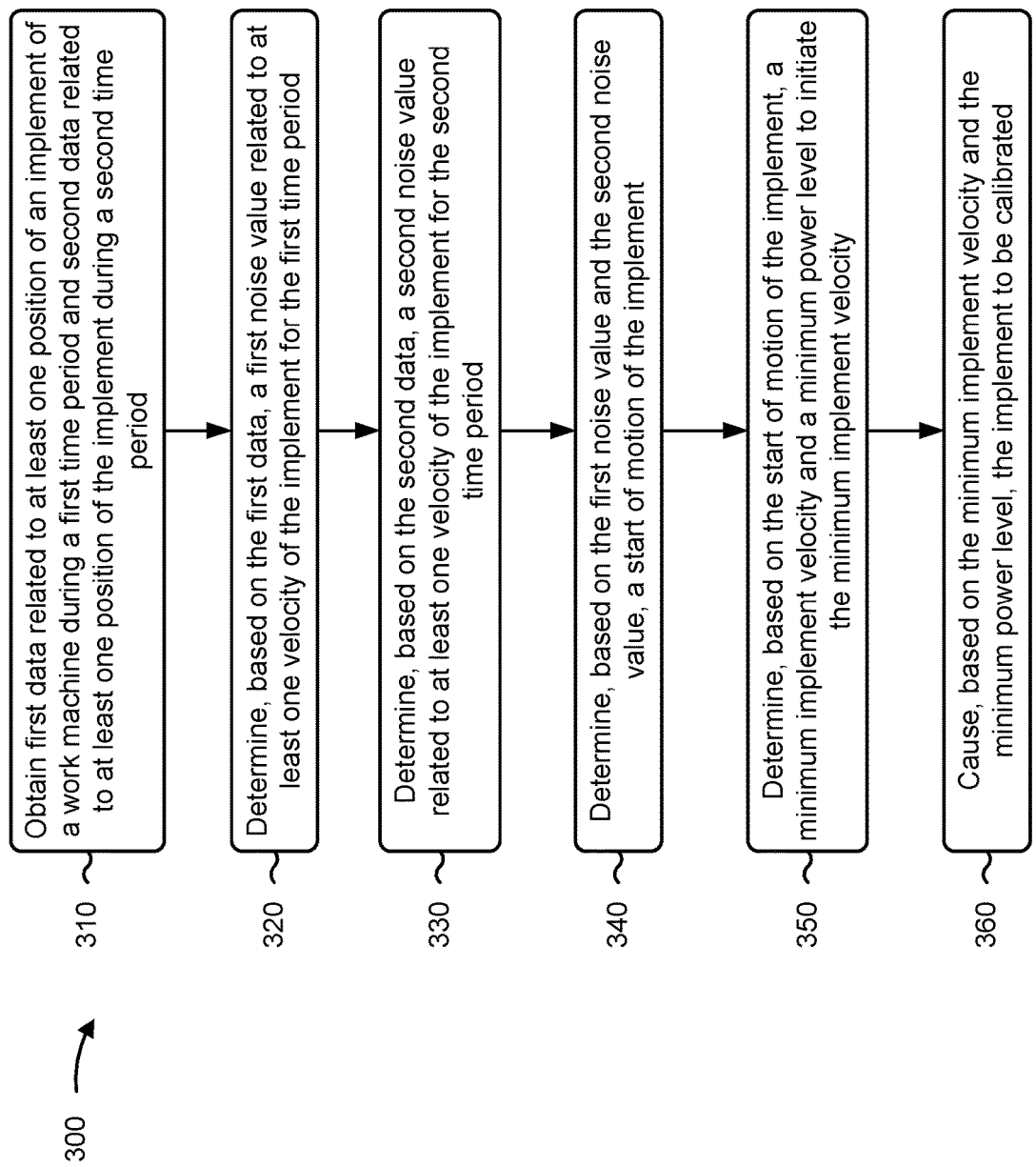

DETERMINING A NOISE BASED START OF MOTION OF AN IMPLEMENT OF A WORK MACHINE

TECHNICAL FIELD

The present disclosure relates generally to calibrating an implement of a work machine and to determining a start of motion of the implement to facilitate calibration of the implement.

BACKGROUND

Various types of machines used, for example, in the construction industry, include implements, such as a blade, a bucket, and/or the like to perform one or more operations. An operator of the machine may interact with operator controls of the machine to cause the implement to move in a particular direction (e.g., up, down, to the right, to the left). However, the implement may not perform properly (e.g., the implement may move faster or slower than desired) if the implement is not calibrated correctly.

In some cases, proper calibration of the implement is based on identifying a minimum velocity of the implement. The minimum velocity of the implement can be determined based on position data (e.g., one or more height measurements, one or more angle measurements, and/or the like) collected by a position sensor associated with the implement. Often, however, the position sensor may be subject to vibrations generated by operation of the machine and/or components of the machine. The vibrations may create noise in the position data, which makes accurately identifying the minimum velocity of the implement difficult (e.g., identifying when the implement starts to move with a minimum velocity).

One attempt to calibrate an attitude and heading reference system of a crane jib is disclosed in U.S. Pat. No. 8,862,419 to Bageshwar et al., issued on Oct. 14, 2014 ("the '419 patent"). In particular, the '419 patent discloses, while one or more crane jib maneuvers are performed, collecting magnetometer measurements using a magnetometer that is attached to the crane jib, supplying the magnetometer measurements to a processor, and in the processor, generating magnetometer calibration parameters using the magnetometer measurements. While the '419 patent may be used to calibrate an attitude and heading reference system of a crane jib, the '419 patent does not, for example, disclose determining a minimum velocity associated with the one or more crane jib maneuvers. The system of the present disclosure solves one or more of the problems set forth above and/or other problems in the art.

SUMMARY

According to some implementations, a method may include obtaining first data related to a plurality of positions of an implement of a work machine during a first time period; determining, based on the first data, a first noise value related to at least one velocity of the implement for the first time period; obtaining second data related to a plurality of positions of the implement during a second time period; determining, based on the second data, a second noise value related to at least one velocity of the implement for the second time period; determining, based on the first noise value and the second noise value, a start of motion of the implement; and causing, based on determining the start of motion of the implement, the implement to be calibrated.

According to some implementations, a controller may include one or more memories, and one or more processors, communicatively coupled to the one or more memories, configured to: obtain first data related to at least one position of an implement of a work machine during a first time period and second data related to at least one position of the implement during a second time period; determine, based on the first data, a first noise value related to at least one velocity of the implement for the first time period; determine, based on the second data, a second noise value related to at least one velocity of the implement for the second time period; determine, based on the first noise value and the second noise value, a start of motion of the implement; determine, based on the start of motion of the implement, a minimum implement velocity and a minimum power level to initiate the minimum implement velocity; and cause, based on the minimum implement velocity and the minimum power level, the implement to be calibrated.

According to some implementations, an implement calibration system may comprise an implement associated with a work machine; at least one sensing device associated with the implement; and a controller configured to: obtain, from the at least one sensing device, first data related to a plurality of positions of the implement during a first time period and second data related to a plurality of positions of the implement during a second time period; determine, based on the first data, a first noise value related to at least one velocity of the implement for the first time period; determine, based on the second data, a second noise value related to at least one velocity of the implement for the second time period; determine, based on the first noise value and the second noise value, a start of motion of the implement; and cause, based on determining the start of motion of the implement, the implement to be calibrated.

BRIEF DESCRIPTION OF THE DRAWINGS

FIG. 3 is a flowchart of an example process to predict implement travel for a work machine.

DETAILED DESCRIPTION

Figure 1:
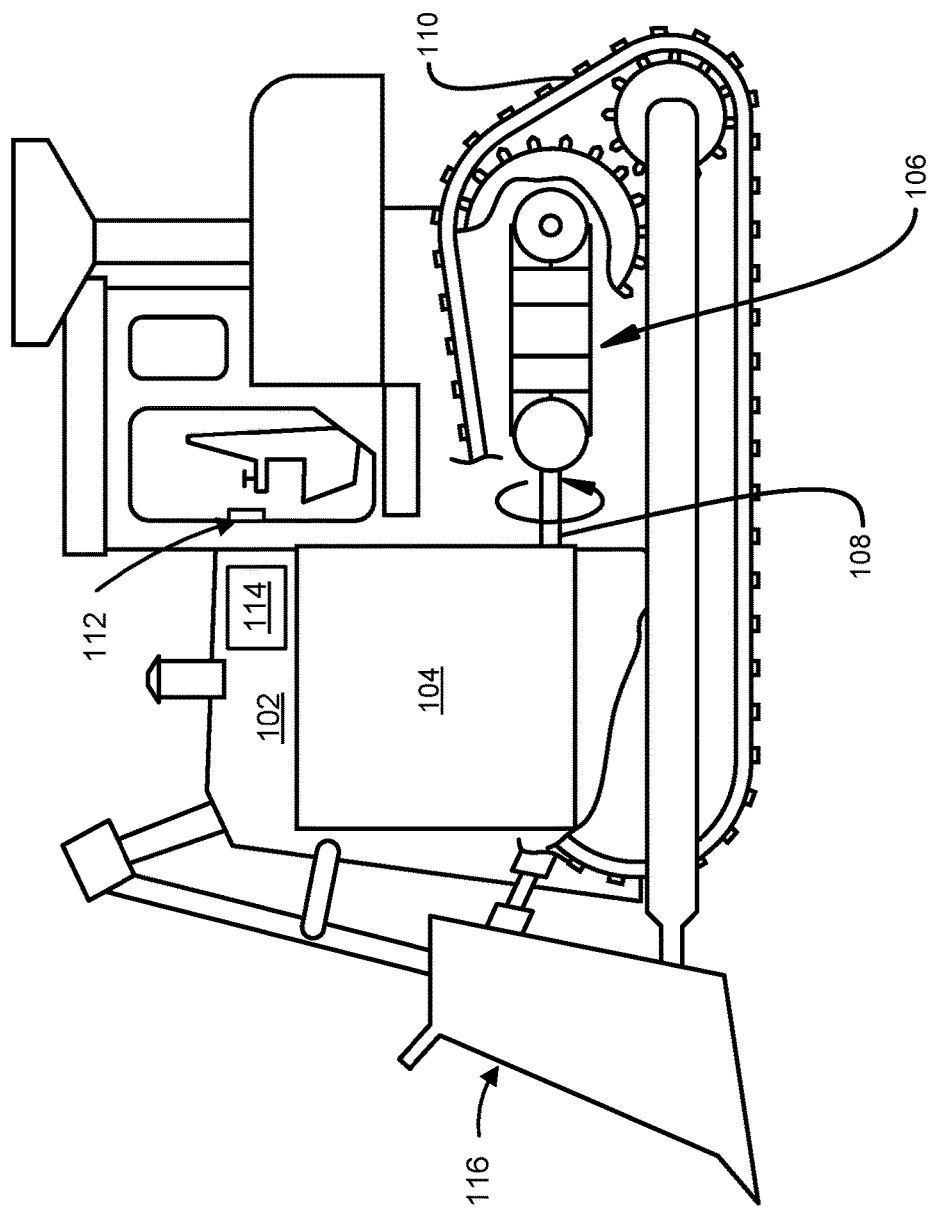
FIG. 1 is a diagram of an example machine described herein.

FIG. 1 is a diagram of an example machine 100 described herein. The term "machine" or "work machine" may refer to any machine that performs an operation associated with an industry such as, for example, mining, construction, farming, transportation, or any other industry. For example, the machine 100 may include a mobile machine, such as a track type tractor shown in FIG. 1, or any other type of mobile machine, as well as any other type of nonmobile machine.

As shown in FIG. 1, the machine 100 includes a frame 102 that supports an engine 104, a drive system 106, a drive shaft 108, and a traction system 110. The machine 100 further includes operator controls 112 that interact with a control device 114 to control an implement 116.

The engine 104 is configured to supply power to the machine 100. The engine 104 may be an internal combustion engine (for example, a compression ignition engine), but in general, the engine 104 may be any prime mover that provides power to various systems of the machine 100. The engine 104 may be fueled by such fuels as distillate diesel fuel, biodiesel, dimethyl ether, gaseous fuels (such as hydrogen, natural gas, and propane), alcohol, ethanol, and/or any combination thereof.

The engine 104 is configured to provide operating power for operation of the implement 116 via, for example, the drive system 106, the drive shaft 108, and/or the like. The engine 104 is operably arranged to receive commands from the operator controls 112. Additionally, the engine 104 is operably arranged with the implement 116 to operate the implement 116 according to the commands received from the operator controls 112.

The drive system 106 is movably connected to the engine 104 via the drive shaft 108 to operate the implement 116 and to propel the machine 100 (e.g., via the traction system 110). The traction system 110 includes a track-drive system, a wheel-drive system, or any other type of drive system configured to propel the machine 100.

Figure 2:
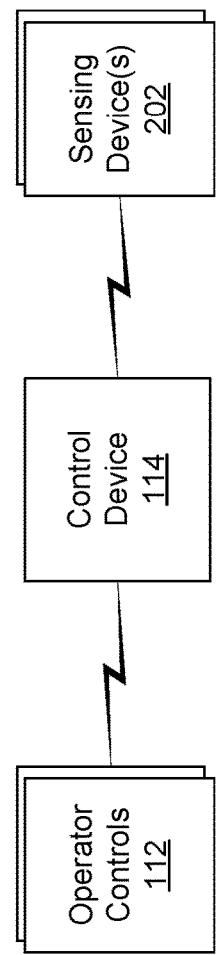
FIG. 2 is a diagram of an example environment described herein.

The operator controls 112 are operably connected to the control device 114 and are configured to generate commands to move the implement 116, as further described herein in relation to FIG. 2. The control device 114 is configured to determine a start of motion of the implement 116 and/or cause the implement 116 to be calibrated, as further described herein in relation to FIG. 2.

The implement 116 is operably arranged with the engine 104 such that the implement 116 is movable through the commands transmitted from the control device 114 to the engine 104. The illustrated implement 116 is a blade that can move up and down, left and right, and/or the like. Other embodiments can include any other suitable implement for performing a variety of tasks, including, for example, ripping, dozing, brushing, compacting, grading, lifting, loading, plowing, and/or the like. Example implements 116 include rippers, augers, buckets, breakers/hammers, brushes, compactors, cutters, forked lifting devices, grader bits and end bits, grapples, and/or the like.

As indicated above, FIG. 1 is provided as an example. Other examples are possible and may differ from what was described in connection with FIG. 1.

FIG. 2 is a diagram of an example environment 200 in which systems and/or methods described herein may be implemented. As shown in FIG. 2, environment 200 includes the operator controls 112, the control device 114, one or more sensing devices 202, and/or the like. Devices of environment 200 may interconnect via wired connections, wireless connections, or a combination of wired and wireless connections.

The operator controls 112 may include one or more implement control devices, such as a dial, a knob, a slider, a joystick, and/or the like to control movement of the implement 116. The operator controls 112 are configured to generate one or more commands to move the implement 116 and send (e.g., directly or via one or more other components or devices of the machine 100, such as a different control device) the one or more commands to the engine 104 and/or the implement 116.

The control device 114 may be a controller, an electronic control unit (ECU), and/or the like of the machine 100. The control device 114 may be implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. The processor may be implemented in hardware, firmware, and/or a combination of hardware and software. The control device 114 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by the control device 114. The control device 114 may include a memory (e.g., a non-transitory computer-readable medium) capable of storing instructions that, when executed, cause the processor to perform one or more processes and/or methods described herein. The control device 114 is configured to determine a start of motion of the implement 116 and/or cause the implement 116 to be calibrated.

The one or more sensing devices 202 (referred to singularly as "sensing device 202" and collectively as "sensing devices 202") include any type of sensor configured to measure a position of the implement 116. For example, the sensing devices 202 may include a global positioning system (GPS) device, a local positioning system (LPS) device, an inertial measurement unit (IMU) device, and/or the like to detect a position of the implement 116. The sensing devices 202 are configured to send (e.g., directly or via one or more other components or devices of the machine 100, such as a different control device) position information concerning the implement 116 to the control device 114 (e.g., on a scheduled basis, on a triggered basis, on an on-demand basis, and/or the like).

In some implementations, an operator of the operator controls 112 (or an automated device) interacts with (e.g., moves, slides, rolls, pushes, and/or the like) the one or more implement control devices of the operator controls 112 to calibrate the implement 116. For example, as part of a calibration process, the operator may interact with the one or more implement control devices of the operator controls 112 to generate a command to move (e.g., to change a position of) the implement 116 to a set position. The operator controls 112 may send the command to the engine 104 and/or the implement 116 to cause the implement 116 to move to the set position. The implement 116 may stay at the set position (e.g., the command may indicate that the implement 116 is not to move) for a first time period (e.g., 500 milliseconds, 2 seconds, 12 seconds, 30 seconds, and/or the like).

During the first time period, the one or more sensing devices 202 collect first data related to the implement 116. The first data may include a plurality of position measurements, such as a plurality of height measurements of the implement 116 (e.g., a plurality of blade lift height measurements), a plurality of angle measurements of the implement 116 (e.g., a plurality of blade tilt angle measurements), and/or the like. Because of vibrations related to operation of the machine 100 and/or components of the machine 100, the plurality of position measurements may be different from each other, even though the implement 116 is configured to stay at the set position. Accordingly, the first data may concern a plurality of positions (e.g., a plurality of heights, a plurality of angles, and/or the like) of the implement 116 during the first time period.

The sensing devices 202 send the first data to the control device 114 (e.g., as the one or more sensing devices 202 collect the first data during the first time period, after the first time period, and/or the like). Upon receiving the first data, the control device 114 may apply a filter, such as a low pass filter, to the first data (e.g., to smooth the first data).

The control device 114 processes the first data to determine a first noise value. The first noise value (e.g., also referred to as a first noise velocity) may indicate an amount of noise related to one or more rates of change in regard to the plurality of positions of the implement 116 (e.g., an amount of noise related to one or more velocities of the implement 116) during the first time period.

In a first scenario, to determine the first noise value, the control device 114 identifies one or more time intervals of the first time period. Each time interval covers an equal length of time and each time interval is associated with a set of positions, of the plurality of positions (e.g., of the implement 116 during the first time period), of the implement 116 during the time interval.

The control device 114 may determine (e.g., based on the first data) a position value (e.g., a height, an angle, and/or the like) associated with each position of the set of positions of the time interval. The control device 114 may sort the set of positions by position value (e.g., using a sorting algorithm, such as a bubble sort algorithm) to identify a position with a maximum position value (e.g., a position with a position value that is greater than or equal to the respective position values of the other positions of the set of positions) and a position with a minimum position value (e.g., a position with a position value that is less than or equal to the respective position values of the other positions of the set of positions). The control device 114 determines an interval-position noise value (e.g., also referred to as a noise amplitude) associated with the time interval based on the position with the maximum position value and the position with the minimum position value. For example, the interval-position noise value may be the difference between the maximum position value and the minimum position.

The control device 114 may determine a noise mean value related to the plurality of positions of the implement during the first time period. For example, the control device 114 may determine an average (e.g., a mean) of each interval-position noise value respectively associated with each time interval of the one or more time intervals that comprise the first time period.

The control device 114 may determine a noise standard deviation value related to the plurality of positions of the implement 116 during the first time period. For example, the control device 114 may calculate a standard deviation of the noise mean value for the first time period and may determine the noise standard deviation value based on the standard deviation of the noise mean value. For example, the control device 114 may cause the noise standard deviation value to be the standard deviation, two standard deviations, three standard deviations, and/or the like of the noise mean value.

The control device 114 may determine the first noise value related to the one or more velocities of the implement 116 during the first time period based on the noise standard deviation value. For example, the control device 114 may cause the first noise value to be the noise standard deviation value divided by the length of time associated with each time interval, of the one or more time intervals, that comprise the first time period.

In a second scenario, to determine the first noise value, the control device 114 identifies the one or more time intervals of the first time period, as described above. Each time interval is associated with a set of velocities, of the one or more velocities (e.g., of the implement 116 during the first time period), of the implement 116 during the time interval. For each time interval, the control device 114 determines a respective interval-velocity noise value related to the set of velocities of the implement 116 during the time interval. For example, the control device 114 may identify an initial position of the implement 116 at a start of the time interval and an ending position of the implement 116 at an end of the time interval. The control device 114 may cause the interval-velocity noise value to be a difference between a position value of the ending position and a position value of the initial position divided by the length of time of the time interval.

The control device 114 may determine the first noise value related to the one or more velocities of the implement 116 during the first time period based on the respective interval-velocity noise values of each time interval. For example, the control device 114 may identify and/or select a maximum interval-velocity noise value, of the respective interval-velocity noise values associated with the one or more time intervals. The maximum interval-velocity noise value may be an interval-velocity noise value associated with a time interval that is greater than or equal to the respective interval-velocity noise values of the other time intervals of the one or more time intervals that comprise the first time period. The control device 114 may determine whether the maximum interval-velocity noise value satisfies a minimum threshold (e.g., a minimum velocity noise threshold). When the control device 114 determines that the maximum interval-velocity noise value satisfies (e.g., is greater than or equal to) the minimum threshold, the control device 114 may cause the first noise value to be the maximum interval-velocity noise value. When the control device 114 determines that the maximum interval-velocity noise value does not satisfy (e.g., is less than) the minimum threshold, the control device 114 may cause the first noise value to be the minimum threshold.

In some implementations, after the first time period and/or after the control device 114 determines the first noise value, the operator of the operator controls 112 (or the automated device) interacts with the one or more implement control devices of the operator controls 112 to generate one or more commands to move the implement 116 from the set position. For example, as part of the calibration process, the operator causes the operator controls 112 to generate one or more commands during a second period, where each command specifies a particular direction to move the implement 116 and a power level. In some implementations, each command indicates the same particular direction and a power level that is higher than a power level of a command that precedes the command. For example, the operator may interact with one or more implement control devices of the operator controls 112 to generate a first command that indicates that the implement 116 is to move in the particular direction at a 1% power level, a second command that indicates that the implement 116 is to move in the particular direction at a 2% power level, a third command that indicates that the implement 116 is to move in the particular direction at a 3% power level, and/or the like during the second period. The operator controls 112 may send the one or more commands to the engine 104 and/or the implement 116 to cause the implement 116 to move from the set position. The operator controls 112 may also send the one or more command signals to the control device 114 (e.g., to facilitate generating and/or updating a calibration map as described herein).

During the second period, the sensing devices 202 collect second data related to the implement 116. The second data may include a plurality of position measurements of the implement 116, such as a plurality of height measurements of the implement 116, a plurality of angle measurements of the implement 116, and/or the like. Because of vibrations related to operation of the machine 100 and/or components of the machine 100, as well as execution of the one or more commands to move the implement 116, the plurality of position measurements may be different from each other.

Accordingly, the second data may concern a plurality of positions (e.g., a plurality of heights, a plurality of angles, and/or the like) of the implement 116 during the second time period.

The sensing devices 202 may send the second data to the control device 114 (e.g., as the sensing devices 202 collect the second data), one time interval at a time. For example, the sensing devices 202 may send one or more position measurements of the implement 116 every 100 milliseconds, every 0.5 seconds, every two seconds, and/or the like. Each time interval covers an equal length of time and each time interval is associated with a set of positions, of the plurality of positions (e.g., of the implement 116 during the second time period), of the implement 116 during the time interval.

The control device 114 may determine a position value (e.g., a height, an angle, and/or the like) associated with each position of the set of positions of the time interval. The control device 114 may sort the set of positions by position value (e.g., using a sorting algorithm, such as the bubble sort algorithm) to identify a position with a maximum position value (e.g., a position with a position value that is greater than or equal to the respective position values of the other positions of the set of positions) and a position with a minimum position value (e.g., a position with a position value that is less than or equal to the respective position values of the other positions of the set of positions).

The control device 114 may store the position with the minimum position value and/or information indicating the time interval as an entry in a first data structure and store the position with the maximum position value and/or information indicating the time interval as an entry in a second data structure. The first data structure and the second data structure may each be configured to store a same amount of entries (e.g., 5 entries, 10 entries, 30 entries, and/or the like). The first data structure and the second data structure may each be configured to store only recent entries (e.g., each data structure may be a queue, such as circular buffer, that overwrites the oldest entry in the queue whenever a new entry is added to the queue). Each data structure may be associated with a time span. For example, where a length of time of a time interval is 100 milliseconds and the first data structure and the data structure are each configured to store five entries, the time span is 500 milliseconds.

The control device 114 may determine a second noise value based on the respective entries of the first data structure and the second data structure. The second noise value (e.g., also referred to as a second noise velocity) may indicate an amount of noise related to one or more rates of change in regard to the plurality of positions of the implement 116 (e.g., an amount of noise related to one or more velocities of the implement 116) during the second time period.

In a first scenario, to determine the second noise value, the control device 114 determines a direction of motion of the implement 116 (e.g., based on two or more entries of the second data structure). For example, the control device 114 may compare a maximum position value of a newest entry of the second data structure and a maximum position value of an oldest entry of the second data structure. When the maximum position value of the newest entry is less than or equal to the maximum position value of the oldest entry, the control device 114 may determine that the implement 116 is moving in a first direction (e.g., a negative direction). When the maximum position value of the newest entry is greater than the maximum position value of the oldest entry, the control device 114 may determine that the implement 116 is moving in a second direction (e.g., a positive direction).

Based on determining that the implement 116 is moving in the first direction, the control device 114 may determine a minimum position value of an oldest entry of the first data structure (e.g., where the oldest entry of the first data structure and the oldest entry of the second data structure indicate the same time interval). The control device 114 may determine a difference between the maximum position value of the newest entry of the second data structure and the minimum position value of the oldest entry of the first data structure. The control device 114 may cause the second noise value to be the difference divided by the time span associated with the first data structure and the second data structure.

Additionally, or alternatively, based on determining that the implement 116 is moving in the second direction, the control device 114 may determine a minimum position value of a newest entry of the first data structure (e.g., where the newest entry of the first data structure and the newest entry of the second data structure indicate the same time interval). The control device 114 may determine a difference between the minimum position value of the newest entry of the first data structure and the maximum position value of the oldest entry of the second data structure. The control device 114 may cause the second noise value to be the difference divided by the time span associated with the first data structure and the second data structure.

In a second scenario, to determine the second noise value, the control device 114 identifies the one or more time intervals of the second time period, as described above. The control device 114 may identify an initial position of the implement 116 at a start of a particular time interval and/or an ending position of the implement 116 at an end of the particular time interval. The second noise value may be a difference between the initial position of the implement 116 at the start of the particular time interval and an initial position of the of the implement 116 at the start of the second time period (e.g., when the one or more commands to move the implement 116 are generated) divided by the length of time between the start of the second time period and the start of the particular time interval. For example, when the particular time interval is associated with 0.5 seconds after the start of the second time period (e.g., 0.5 seconds after the one or more commands are generated to move the implement 116), the control device 114 may determine the second noise value based on the initial position of the implement 116 at the start of the particular time interval and the initial position of the implement 116 at the start of the second time period. Additionally, or alternatively, the second noise value may be a difference between an ending position of the implement 116 at the end of the particular time interval and an initial position of the of the implement 116 at the start of the second time period divided by the length of time between the start of the second time period and the end of the particular time interval. For example, when the particular time interval is associated with 0.3 seconds after the start of the second time period (e.g., 0.3 seconds after the one or more commands are generated to move the implement 116), the control device 114 may determine the second noise value based on the ending position of the implement 116 at the end of the particular time interval and the initial position of the implement 116 at the start of the second time period.

In some implementations, the control device 114 determines, based on the first noise value and the second noise value, whether a start of motion of the implement 116 has occurred (e.g., whether the implement 116 has actually started to move). For example, the control device 114 may determine whether a difference between the first noise value and the second noise value satisfies a threshold (e.g., a minimum noise velocity threshold). When the control device 114 determines that the difference does not satisfy (e.g., is less than or equal to) the threshold, the control device 114 determines that the start of motion of the implement 116 has not occurred. The control device 114 may continue to collect and process the second data as described above.

Additionally, or alternatively, when the control device 114 determines that the difference satisfies (e.g., is greater than) the threshold, the control device 114 may determine that the start of motion of the implement 116 has occurred. Accordingly, the control device 114 causes the implement 116 to be calibrated.

In some implementations, to calibrate the implement 116, the control device 114 may determine a minimum implement velocity associated with the start of motion of the implement. The minimum implement velocity may be based on the first noise value and/or the second noise value (e.g., the minimum implement velocity may be the difference between the first noise value and the second noise value). Additionally, or alternatively, the control device 114 may determine a minimum power level (e.g., to initiate the minimum implement velocity) associated with the start of motion of the implement 116. The minimum power level may be a power level associated with a command that was being executed, by the engine 104 and/or implement 116 to move the implement 116 from the set position, when the control device 114 determined that the start of motion of the implement 116 had occurred. The control device 114 may obtain the command from the operator controls 112 to determine the power level associated with the command.

The control device 114 may cause the implement to be calibrated based on the minimum implement velocity and/or the minimum power level. For example, the control device 114 may cause a calibration map to be created and/or updated and may generate and add an entry to the calibration map that indicates the minimum implement velocity and the minimum power level. The calibration map may include information concerning respective relationships between representative velocities of the implement 116 and representative power levels.

As another example, the control device 114 may generate and add one or more entries to the calibration map based on the entry that indicates the minimum implement velocity and the minimum power level. For example, the control device 114 may derive (e.g., using an algorithm) a maximum implement velocity at a maximum power level based on the entry that indicates the minimum implement velocity and the minimum power level, and may generate an entry that indicates the maximum implement velocity and the maximum power level. In this way, the control device 114 may generate and/or update the calibration map to include one or more entries, where each entry indicates an association between an implement velocity and a power level.

FIG. 3 is a flow chart of an example process 300 for determining a start of motion of an implement of a work machine. One or more process blocks of FIG. 3 may be performed by a control device (e.g., control device 114). In some implementations, one or more process blocks of FIG. 3 may be performed by another device or a group of devices separate from or including the controller, such as operator controls (e.g., operator controls 112), sensing devices (e.g., sensing devices 202), and/or the like.

As shown in FIG. 3, process 300 may include obtaining first data related to at least one position of an implement of a work machine during a first time period and second data related to at least one position of the implement during a second time period (block 310). For example, the control device may obtain first data related to at least one position of an implement of a work machine during a first time period and second data related to at least one position of the implement during a second time period, as described above.

As further shown in FIG. 3, process 300 may include determining, based on the first data, a first noise value related to at least one velocity of the implement for the first time period (block 320). For example, the control device may determine, based on the first data, a first noise value related to at least one velocity of the implement for the first time period, as described above.

As further shown in FIG. 3, process 300 may include determining, based on the second data, a second noise value related to at least one velocity of the implement for the second time period (block 330). For example, the control device may determine, based on the second data, a second noise value related to at least one velocity of the implement for the second time period, as described above.

As further shown in FIG. 3, process 300 may include determining, based on the first noise value and the second noise value, a start of motion of the implement (block 340). For example, the control device may determine, based on the first noise value and the second noise value, a start of motion of the implement, as described above.

As further shown in FIG. 3, process 300 may include determining, based on the start of motion of the implement, a minimum implement velocity and a minimum power level to initiate the minimum implement velocity (block 350). For example, the control device may determine, based on the start of motion of the implement, a minimum implement velocity and a minimum power level to initiate the minimum implement velocity, as described above.

As further shown in FIG. 3, process 300 may include causing, based on the minimum implement velocity and the minimum power level, the implement to be calibrated (block 360). For example, the control device may cause, based on the minimum implement velocity and the minimum power level, the implement to be calibrated, as described above.

Process 300 may include additional implementations, such as any single implementation or any combination of implementations described in connection with one or more other processes described elsewhere herein.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The disclosed control device (e.g., the control device 114) may be used to facilitate calibration of any implement of any work machine. The control device 114 determines, based on first data from a position sensor, a first noise value related to at least one velocity of the implement when the implement is still at a set position and determines, based on second data from the position sensor, a second noise value related to at least one velocity of the implement when a sequence of commands with increasing power levels are being executed to cause the implement to move from the set position. The control device is able to identify a start of motion of the implement by comparing the first noise value and the second noise value. Accordingly, based on identifying the start of motion, the control device determines a minimum implement velocity and/or a minimum power level to initiate the minimum implement velocity and thereby causes the implement to be calibrated.

In this way, the control device is able to accurately determine the start of motion of the implement, even when the first data and the second data are noisy. This allows the control device to accurately determine the minimum implement velocity and/or the minimum power level, which enables the control device to generate an accurate calibration map. The calibration map can then be used to improve a performance of the implement 116 and/or the machine 100.

What is claimed is:

1. A method, comprising:
obtaining first data related to a first plurality of positions of an implement of a work machine during a first time period, wherein
the first data includes an interval noise value,
the first plurality of positions include a first position and a second position, and
obtaining the first data includes:
identifying a time interval of the first time period,
identifying the first position during the time interval,
identifying the second position during the time interval, and
determining the interval noise value based on the first position and the second position;
determining, based on the first data, a first noise value related to at least one first velocity of the implement for the first time period;
obtaining second data related to a second plurality of positions of the implement during a second time period;
determining, based on the second data, a second noise value related to at least one second velocity of the implement for the second time period;
determining, based on the first noise value and the second noise value, a start of motion of the implement; and
causing, based on determining the start of motion of the implement, the implement to be calibrated.

2. The method of claim 1, wherein the first data includes one or more first height measurements of the implement during the first time period and the second data includes one or more second height measurements of the implement during the second time period.

3. The method of claim 1, wherein determining the first noise value comprises:
determining, based on the interval noise value, a first noise mean value related to the first plurality of positions;
determining, based on the first noise mean value, a first noise standard deviation value related to the first plurality of positions; and
determining, based on the first noise standard deviation value, the first noise value.

4. The method of claim 3, wherein the first noise standard deviation value is based on two standard deviations of the first noise mean value.

5. The method of claim 1, wherein the interval noise value is a first interval noise value, and the time interval is a first time interval;
wherein obtaining the first data further comprises:
identifying a second time interval of the first time period; and
determining a second interval noise value; and
wherein determining the first noise value comprises:
identifying a maximum interval noise value of the interval noise value and the second interval noise value; and causing the first noise value to be assigned the maximum interval noise value.

6. The method of claim 1, wherein determining the start of motion of the implement comprises:
determining a difference between the first noise value and the second noise value;
determining that the difference satisfies a minimum threshold; and
determining, based on determining that the difference satisfies the minimum threshold, the start of motion of the implement.

7. The method of claim 1, wherein causing the implement to be calibrated comprises:
determining a minimum implement velocity associated with the start of motion of the implement;
determining a minimum power level associated with the start of motion of the implement; and
causing, based on the minimum implement velocity and the minimum power level, a calibration map that includes one or more entries to be created,
wherein each entry, of the one or more entries, indicates an association between a power level and an implement velocity.

8. The method of claim 1, wherein the first position has a maximum position value of position values of the first plurality of positions;
wherein the second position has a minimum position value of the position values of the first plurality of positions; and
wherein the interval noise value is an interval-position noise value.

9. The method of claim 1, wherein the first position is an initial position of the implement at a start of the time interval;
wherein the second position is an ending position of the implement at an end of the time interval; and
wherein the interval noise value is an interval-velocity noise value.

10. A controller, comprising:
one or more memories; and
one or more processors, implemented in hardware and communicatively coupled to the one or more memories, configured to:
obtain first data related to a first plurality of positions of an implement of a work machine during a first time period and second data related to a second plurality of positions of the implement during a second time period, wherein
the first data includes an interval noise value,
the first plurality of positions include a first position and a second position, and
obtaining the first data includes:
identifying a time interval of the first time period,
identifying the first position during the time interval,
identifying the second position during the time interval, and
determining the interval noise value based on the first position and the second position;
determine, based on the first data, a first noise value related to at least one first velocity of the implement for the first time period;
determine, based on the second data, a second noise value related to at least one second velocity of the implement for the second time period;
determine, based on the first noise value and the second noise value, a start of motion of the implement;

determine, based on the start of motion of the implement, a minimum implement velocity and a minimum power level to initiate the minimum implement velocity; and cause, based on the minimum implement velocity and the minimum power level, the implement to be calibrated.

11. The controller of claim 10, wherein the minimum power level is provided by an implement control device of the work machine.

12. The controller of claim 10, wherein the first data includes one or more first angle measurements of the implement during the first time period, and the second data includes one or more second angle measurements of the implement during the second time period.

13. The controller of claim 10, wherein the one or more processors, when determining the first noise value, are configured to:

determine whether the interval noise value is greater than or equal to a minimum threshold; and cause, based on determining that the interval noise value is not greater than or equal to the minimum threshold, the first noise value to be the minimum threshold.

14. The controller of claim 10, wherein the one or more processors, when determining the first noise value, are configured to:

determine whether the interval noise value is greater than or equal to a minimum threshold; and cause, based on determining that the interval noise value is greater than or equal to the minimum threshold, the first noise value to be the interval noise value.

15. The controller of claim 10, wherein the one or more processors are further configured to:

apply, before determining the first noise value and before determining the second noise value, a low pass filter to the first data and the second data.

16. An implement calibration system, comprising:

an implement associated with a work machine;

at least one sensing device associated with the implement; and a controller configured to:

obtain, from the at least one sensing device, first data related to a first plurality of positions of the implement during a first time period and second data related to a second plurality of positions of the implement during a second time period, wherein the first data includes an interval noise value, the first plurality of positions include a first position and a second position, and obtaining the first data includes:

identifying a time interval of the first time period, identifying the first position during the time interval, identifying the second position during the time interval, and determining the interval noise value based on the first position and the second position;

determine, based on the first data, a first noise value related to at least one first velocity of the implement for the first time period;

determine, based on the second data, a second noise value related to at least one second velocity of the implement for the second time period;

determine, based on the first noise value and the second noise value, a start of motion of the implement; and cause, based on determining the start of motion of the implement, the implement to be calibrated.

17. The implement calibration system of claim 16, wherein the implement is a blade, a ripper, an auger, a bucket, a breaker, a hammer, a brush, a compactor, a cutter, a forked lifting device, or a grader bit.

18. The implement calibration system of claim 16, wherein the at least one sensing device is an inertial measurement unit device, a local positioning system device, or a global positioning system device.

19. The implement calibration system of claim 16, wherein the first position has a maximum position value of position values of the first plurality of positions;

wherein the second position has a minimum position value of the position values of the first plurality of positions; and wherein the interval noise value is an interval-position noise value.

20. The implement calibration system of claim 16, wherein the first position is an initial position of the implement at a start of the time interval;

wherein the second position is an ending position of the implement at an end of the time interval; and wherein the interval noise value is an interval-velocity noise value.

* * * * *